US012574145B2

(12) United States Patent
Chen et al.

(10) Patent No.: US 12,574,145 B2
(45) Date of Patent: Mar. 10, 2026

(54) CODING METHOD AND APPARATUS

(71) Applicant: Huawei Technologies Co., Ltd.,
Shenzhen (CN)

(72) Inventors: Li Chen, Guangzhou (CN); Rong Li,
Hangzhou (CN); Jinjun Cheng,
Guangzhou (CN); Xianbin Wang,
Hangzhou (CN)

(73) Assignee: Huawei Technologies Co., Ltd.,
Shenzhen (CN)

( * ) Notice: Subject to any disclaimer, the term of this
patent is extended or adjusted under 35
U.S.C. 154(b) by 322 days.

(21) Appl. No.: 18/344,196

(22) Filed: Jun. 29, 2023

(65) Prior Publication Data

US 2024/0007222 A1     Jan. 4, 2024

Related U.S. Application Data

(63) Continuation of application No.
PCT/CN2021/142162, filed on Dec. 28, 2021.

(30) Foreign Application Priority Data

Dec. 31, 2020   (CN) .......................... 202011633285.4

(51) Int. Cl.
*H04L 1/00*        (2006.01)
(52) U.S. Cl.
CPC .......... *H04L 1/0052* (2013.01); *H04L 1/0061*
(2013.01); *H04L 1/0076* (2013.01)

(58) Field of Classification Search
CPC ... H04L 1/0052; H04L 1/0061; H04L 1/0076;
H03M 13/611; H03M 13/616; H03M
13/1515; H03M 13/152; H03M 13/05;
H03M 13/033
See application file for complete search history.

(56) References Cited

U.S. PATENT DOCUMENTS

2009/0193316 A1*  7/2009  Tayler ................ G11B 20/1866
                                                   714/763
2018/0039540 A1*  2/2018  Lu ........................ G06F 11/1048

OTHER PUBLICATIONS

Tanuma, Naoya et al: "Known Bits Puncturing for Systematic Polar
Codes", 25th Asia-Pacific Conference on Communications (APCC),
IEEE, Nov. 6, 2019, pp. 511-515, XP033730944, DOI: 10.1109/
APCC47188.2019.9026532.
Suresh, Vinayak et al: "A Novel Systematic Representation of
Reed-Muller Codes with an Application to Linear Block Feedback
Encoding", 54th Asilomar Conference on Signals, Systems, and
Computers, IEEE, Nov. 2020, pp. 677-682, XP033921428 , DOI:
10.1109/IEEECONF51394.2020.9443531.

* cited by examiner

*Primary Examiner* — Thien Nguyen
(74) *Attorney, Agent, or Firm* — Slater Matsil, LLP

(57) ABSTRACT
A coding method and apparatus are provided. The method
includes: coding an information bit by using a preset gen-
erator matrix of a systematic (U|U+V)-code to obtain a
codeword of a systematic code. The preset generator matrix
of the systematic (U|U+V)-code includes a first identity
sub-matrix of a U code and a second identity sub-matrix of
a V code. A plurality of elements in a same column as the
first identity sub-matrix are all 0. A plurality of elements in
a same column as the second identity sub-matrix are all 0.

20 Claims, 7 Drawing Sheets

∼ 401

Determine first information

∼ 402

Code the first information by using a preset generator
matrix of a systematic (U|U+V)-code to obtain second
information $$H = \begin{bmatrix} 0 & 1 & 1 & 1 & 0 & 0 & 0 \\ 1 & 0 & 1 & 0 & 1 & 0 & 0 \\ 1 & 0 & 0 & 0 & 0 & 1 & 0 \\ 0 & 1 & 1 & 0 & 0 & 0 & 1 \end{bmatrix}$$

$$P = \begin{bmatrix} 0 & 1 & 1 \\ 1 & 0 & 1 \\ 1 & 0 & 0 \\ 0 & 1 & 1 \end{bmatrix} \qquad I = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

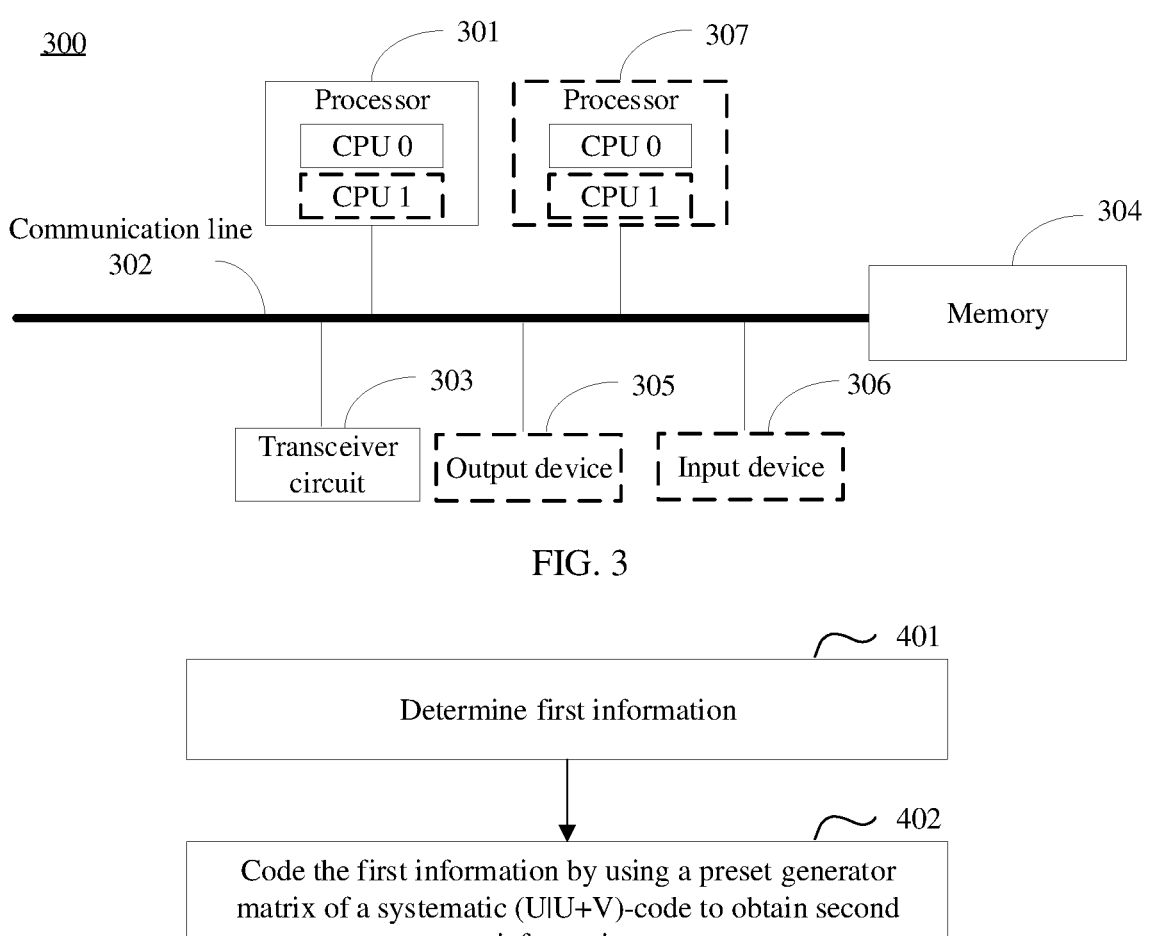
FIG. 3
Determine first information — 401
Code the first information by using a preset generator matrix of a systematic (U|U+V)-code to obtain second information — 402
FIG. 4
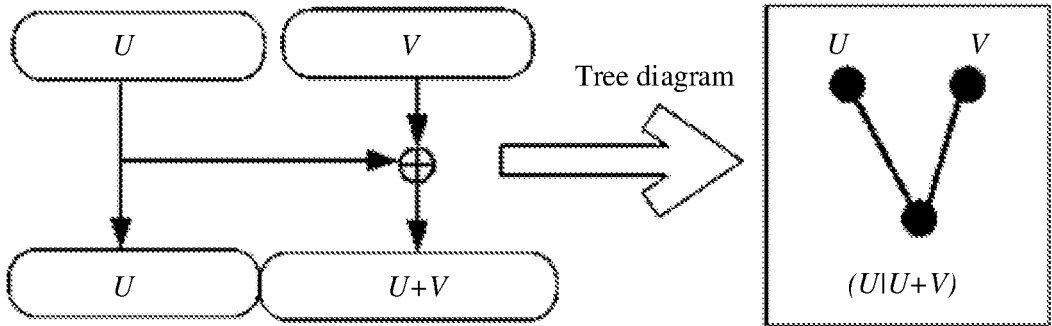
FIG. 5

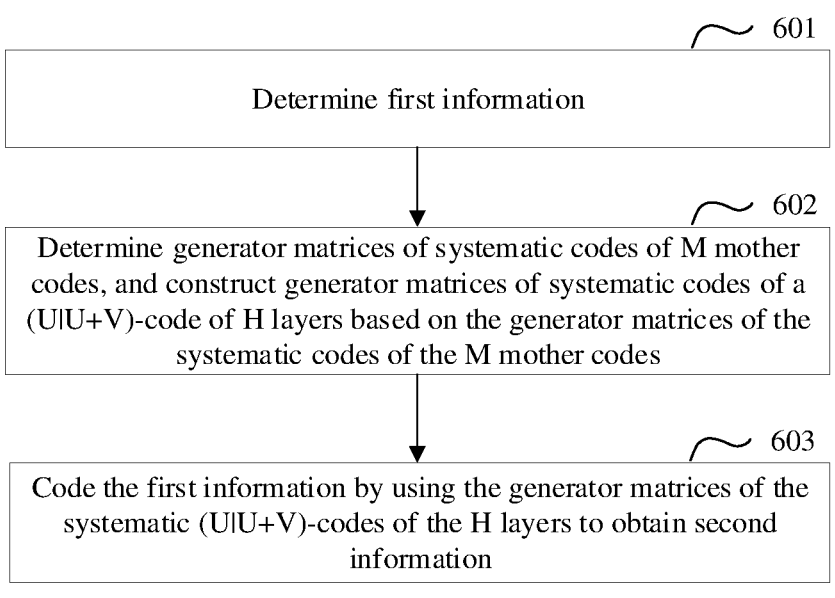

Determine first information ~ 601

Determine generator matrices of systematic codes of M mother codes, and construct generator matrices of systematic codes of a (U|U+V)-code of H layers based on the generator matrices of the systematic codes of the M mother codes ~ 602

Code the first information by using the generator matrices of the systematic (U|U+V)-codes of the H layers to obtain second information ~ 603

FIG. 6

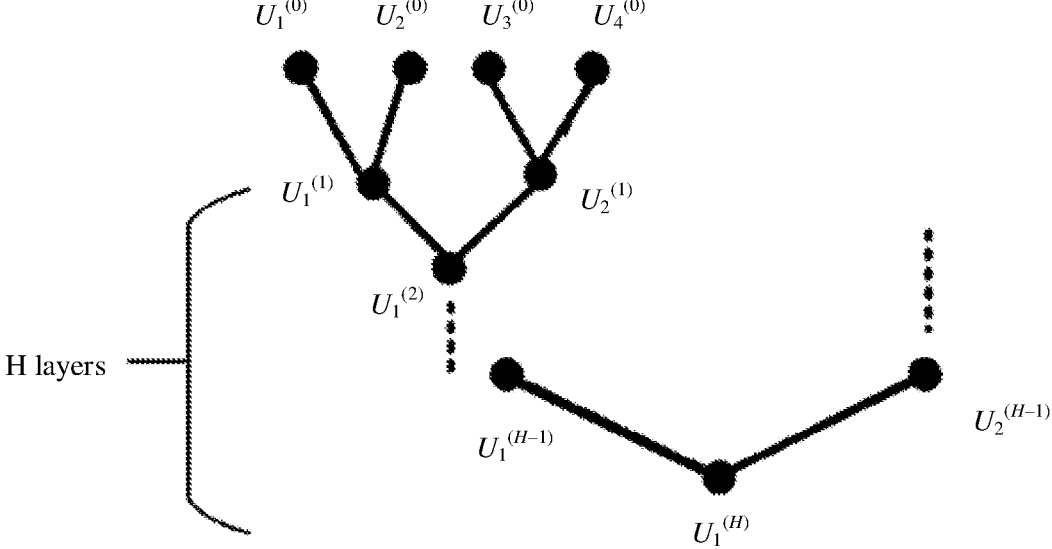

FIG. 7

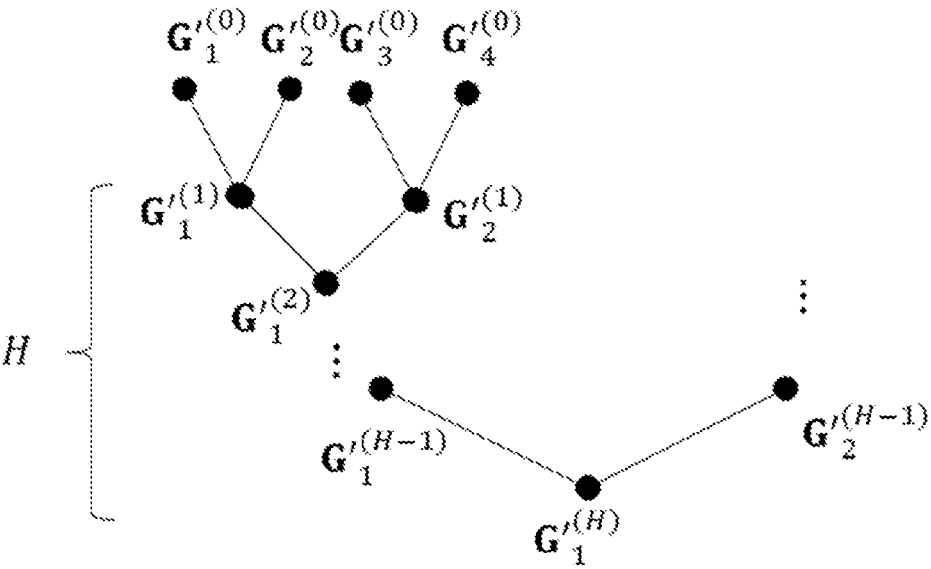

Determine first information

902

Code a first code group based on a generator matrix of a systematic code of a U code to obtain a first codeword, and code a second code group based on a generator matrix of a systematic code of a V code to obtain a second codeword

903

Perform a preset (U|U+V)-coding operation based on the first codeword and the second codeword to obtain second information, where the second information is a codeword of a systematic code

FIG. 9

CODING METHOD AND APPARATUS

CROSS-REFERENCE TO RELATED APPLICATIONS

This application is a continuation of International Application No. PCT/CN2021/142162, filed on Dec. 28, 2021, which claims priority to Chinese Patent Application No. 202011633285.4, filed on Dec. 31, 2020. The disclosures of the aforementioned applications are hereby incorporated by reference in their entireties.

TECHNICAL FIELD

This application relates to the field of communication technologies, and in particular, to a coding method and apparatus.

BACKGROUND

Channel coding is a key technology for a wireless communication system. Currently, common channel coding may be roughly classified into classical algebraic coding and modern coding. Classical algebraic coding, for example, a BCH/RS code, is good in code distance, but there is no low-complexity decoding algorithm for classical algebraic coding. For modern coding widely used in a modern communication system, for example, a Turbo code and a low-density parity-check (LDPC) code, there is a low-complexity decoding algorithm, and decoding performance is good when a code length is large. However, once the code length decreases, the decoding performance is greatly reduced.

In conclusion, all the foregoing channel coding manners need to be improved.

SUMMARY

This application provides a coding method and apparatus, to provide a channel coding scheme which has high performance in a medium/small code length range and for which there is a low-complexity decoding algorithm.

According to a first aspect, an embodiment of this application provides a coding method. The method may include: determining first information, where the first information is a to-be-coded element; and coding the first information by using a preset generator matrix of a systematic (U|U+V)-code to obtain second information. The preset generator matrix of the systematic (U|U+V)-code includes a first identity sub-matrix of a U code and a second identity sub-matrix of a V code. A plurality of elements in a same column as the first identity sub-matrix are all 0. A plurality of elements in a same column as the second identity sub-matrix are all 0.

According to the foregoing design, the first information is coded by using the preset generator matrix of the systematic (U|U+V)-code, and the obtained second information is a systematic (U|U+V)-code. The U code and the V code may be any type of codes, for example, BCH codes or RS codes. In this coding manner, not only are low decoding complexity and a good code distance ensured, but also convenience of engineering implementation is improved. Furthermore, in the foregoing manner, a plurality of code lengths and coding rates may be flexibly adapted only by storing a generator matrix of a systematic code of a mother code, so that this manner is lower in storage overhead than a manner of storing a generator matrix of a (U|U+V)-code.

In a possible design, a dimension of the U code is Ku. A dimension of the V code is Kv. A code length n of the U code is the same as that of the V code. The first information includes a first code group and a second code group. A code length of the first code group is Ku. A code length of the second code group is Kv.

In a possible design, the preset generator matrix of the systematic (U|U+V)-code is obtained by substituting a generator matrix of a systematic code of the U code and a generator matrix of a systematic code of the V code based on a generator matrix of a (U|U+V) structure and performing equivalent transformation. The generator matrix of the systematic code of the U code includes the first identity sub-matrix and a first check sub-matrix. The generator matrix of the systematic code of the V code includes the second identity sub-matrix and a second check sub-matrix.

In a possible design, the preset generator matrix of the systematic (U|U+V)-code meets:

$$G'_{U|U+V} = \begin{bmatrix} I_U{:}P_U & 0{:}P' \\ 0 & I_V{:}P_V \end{bmatrix}$$

$G'_{U|U+V}$ represents the preset generator matrix of the systematic (U|U+V)-code. $I_U$ represents the first identity sub-matrix. $I_V$ represents the second identity sub-matrix. $P_U$ represents the first check sub-matrix. $P_V$ represents the second check sub-matrix.

P' meets $P'(1{:}k_v,{:})=P_U(1{:}k_v,{:})+P_V,P'((1+k_v){:}k_v,{:})=P_U((1+k_v){:}k_v,{:})$. $X(1{:}k_v,{:})$ represents a first row to a $Kv^{th}$ row of a matrix X. X is P' or $P_U$.

For example, the U code and the V code may be BCH codes or Reed-Solomon RS codes with a same code length.

According to a second aspect, an embodiment of this application provides a coding method. The method may include: determining first information, where the first information is a to-be-coded element; and coding the first information by using generator matrices of systematic (U|U+V)-codes of H layers to obtain second information. The generator matrices of the systematic (U|U+V)-codes of the H layers are constructed based on generator matrices of systematic codes of M mother codes. Code lengths n of the M mother codes are the same. H is an integer greater than or equal to 1, and $M=2^H$. A generator matrix of an $i^{th}$ systematic code at an $h^{th}$ layer in a (U|U+V)-code of H layers consists of a generator matrix of a $2i^{th}$ systematic code at an $(h-1)^{th}$ layer in the (U|U+V)-code of H layers and a generator matrix of a $(2i-1)^{th}$ systematic code at the $(h-1)^{th}$ layer. A generator matrix of an $i^{th}$ systematic code at a first layer in the (U|U+V)-code of H layers consists of a generator matrix of a systematic code of a $2i^{th}$ mother code in the M mother codes and a generator matrix of a systematic code of a $(2i-1)^{th}$ mother code. h is an integer whose value ranges from 1 to H, and i is an integer whose value ranges from 1 to $2^{H-h}$.

According to the foregoing design, a codeword of a systematic (U|U+V)-code with a flexible length may be constructed. Compared with separately storing a generator matrix of a (U|U+V)-code of H layers, this method is lower in storage overhead and easier to implement.

In a possible design, the generator matrix of the $i^{th}$ systematic code includes an identity sub-matrix of the generator matrix of the systematic code of the $2i^{th}$ mother code and an identity sub-matrix of the generator matrix of the systematic code of the $(2i-1)^{th}$ mother code. Elements in a plurality of columns corresponding to the identity sub-matrix of the generator matrix of the systematic code of the $2i^{th}$ mother code are 0. Elements in a plurality of columns corresponding to the identity sub-matrix of the generator matrix of the systematic code of the $(2i-1)^{th}$ mother code are 0. A dimension of the $2i^{th}$ mother code is Ku. A dimension of the $(2i-1)^{th}$ mother code is Kv. A code length n of the $2i^{th}$ mother code is the same as that of the $(2i-1)^{th}$ mother code. The first information includes M code groups. M is a positive integer greater than 0. A code length of a $(2i-1)^{th}$ code group in the M code groups is Ku. A code length of a $2i^{th}$ code group in the M code groups is Kv.

For example, the M mother codes may be BCH codes or Reed-Solomon RS codes.

According to a third aspect, an embodiment of this application provides a coding method. The method may include: determining first information, where the first information is a to-be-coded element, and the first information includes a first code group and a second code group; coding the first code group by using a generator matrix of a systematic code of a U code to obtain a first codeword; coding the second code group by using a generator matrix of a systematic code of a V code to obtain a second codeword, where a dimension of the U code is Ku, a dimension of the V code is Kv, a code length n of the U code is the same as that of the V code, a code length of the first code group is Ku, and a code length of the second code group is Kv; and performing a preset (U|U+V)-coding operation based on the first codeword and the second codeword to obtain second information. The second information is a codeword of a systematic code.

According to the foregoing design, different code lengths and coding rates may be flexibly adapted only by storing a generator matrix of a systematic code of a mother code. Compared with a manner of storing a generator matrix of a (U|U+V)-code, this application has the advantage that generation of the generator matrix of the (U|U+V)-code may be avoided, so that calculation complexity is reduced, and in addition, storage overhead may be reduced.

In a possible design, the second information is a (U|U+V)-code of one layer. The second information meets:

$$c'=(u',u'+v'+m_{U}|_0^{k_V-1}G'_V)$$

c' represents the second information. u' represents first partial information. v' represents second partial information. mu represents the first code group. $m_{U}|_0^{k_V-1}$ represents that first to $(k_V-1)^{th}$ elements of the first code group are selected. $G'_V$ represents a second identity sub-matrix.

In a possible design, the generator matrix of the systematic code of the U code includes a first identity sub-matrix and a first check sub-matrix. The generator matrix of the systematic code of the V code includes the second identity sub-matrix and a second check sub-matrix.

For example, the U code and the V code may be BCH codes or Reed-Solomon RS codes.

According to a fourth aspect, an apparatus is provided. The apparatus may be a coding apparatus, or a chip or a system-on-a-chip in a coding apparatus, or may be another module or unit capable of implementing a method on a coding apparatus side. The apparatus may implement a function performed by a coding apparatus in the first aspect or any possible design, implement a function performed by a coding apparatus in the second aspect or any possible design, or implement a function performed by a coding apparatus in the third aspect or any possible design. The function may be implemented by hardware.

According to a fifth aspect, a computer-readable storage medium is provided. The computer-readable storage medium stores instructions. When the instructions run on a computer, the computer is enabled to perform the coding method in the first aspect or any possible design of the first aspect, perform the coding method in the second aspect or any possible design of the second aspect, or perform the coding method in the third aspect or any possible design of the third aspect.

According to a sixth aspect, a computer program product including instructions is provided. The computer program product may include program instructions. When the computer program product runs on a computer, the computer is enabled to perform the coding method in the first aspect or any possible design of the first aspect, perform the coding method in the second aspect or any possible design of the second aspect, or perform the coding method in the third aspect or any possible design of the third aspect.

According to a seventh aspect, a chip system is provided. The chip system includes a processor and a communication interface. The chip system may be configured to implement a function performed by a coding apparatus in the first aspect or any possible design of the first aspect. In still another possible design, the chip system may implement a function performed by a coding apparatus in the second aspect or each possible design of the second aspect. In still another possible design, the chip system may implement a function performed by a coding apparatus in the third aspect or each possible design of the third aspect.

In a possible design, the chip system further includes a memory. The memory is configured to store program instructions and/or data. When the chip system runs, the processor executes the program instructions stored in the memory, to enable the chip system to perform the coding method in the first aspect or any possible design of the first aspect, perform the coding method in the second aspect or any possible design of the second aspect, or perform the coding method in the third aspect or any possible design of the third aspect. The chip system may include a chip, or may include a chip and another discrete device. This is not limited.

For descriptions of technical effects that may be achieved in any aspect or design of the fourth aspect to the seventh aspect, refer to the technical effects that may be achieved in any possible design of the first aspect to the third aspect. No repeated description is provided.

BRIEF DESCRIPTION OF THE DRAWINGS

FIG. 3 is a schematic diagram of a structure of an apparatus according to an embodiment of this application;

FIG. 4 is a flowchart of a coding method according to an embodiment of this application;

FIG. 5 is a schematic diagram of a (U|U+V) code according to an embodiment of this application;

FIG. 6 is a flowchart of another coding method according to an embodiment of this application;

FIG. 7 is a schematic diagram of constructing a (U|U+V)-code of H layers according to an embodiment of this application;

FIG. 8 is a schematic diagram of constructing generator matrices of systematic (U|U+V)-codes of H layers according to an embodiment of this application;

FIG. 9 is a flowchart of still another coding method according to an embodiment of this application;

DETAILED DESCRIPTION OF ILLUSTRATIVE EMBODIMENTS

Figures 1A, 1B:
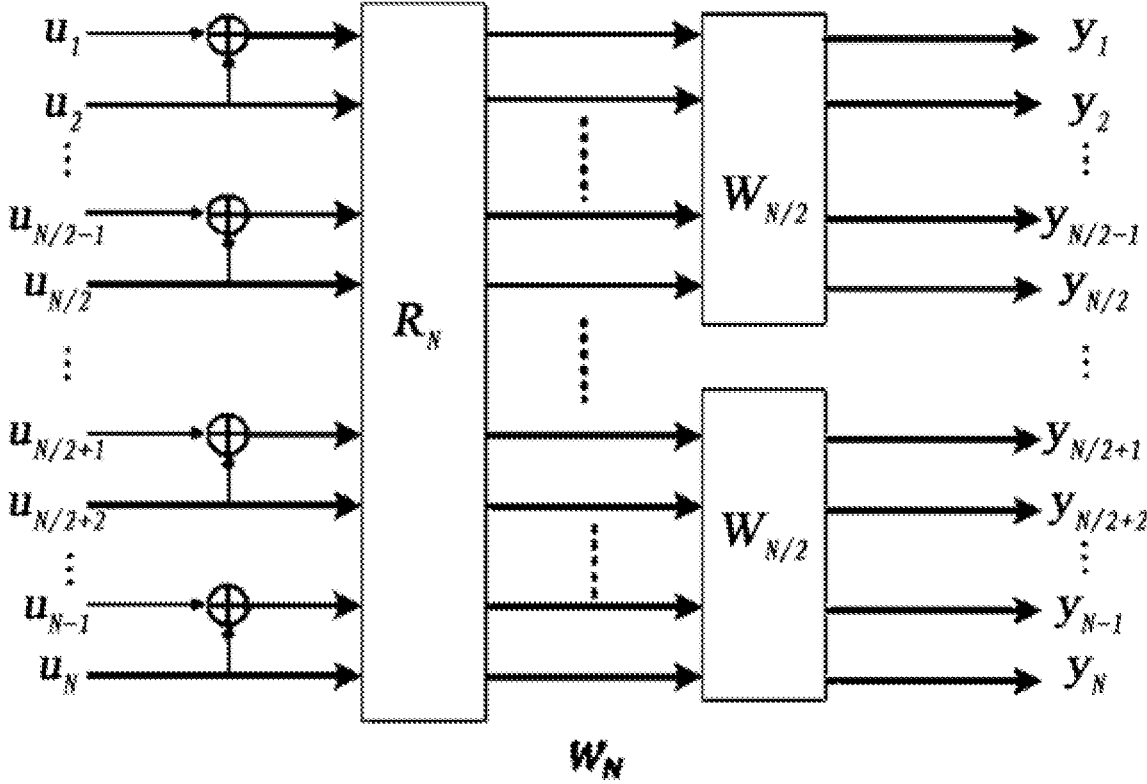
FIG. 1*a* is a schematic diagram of a generator matrix.
FIG. 1*b* is a schematic diagram of coding based on a polar code.

Before embodiments of this application are described, related technical terms in embodiments of this application are explained and described. It is to be noted that these explanations and descriptions are intended to make embodiments of this application more easily understood, but should not constitute a limitation on the protection scope of this application.

Concepts in embodiments of this application are first described, to help understand the technical solutions of this application.

1: Channel coding: It means performing, by using a code, coding processing on information bits that need to be sent, added with redundant bits, to obtain coded bits. A transmission error is corrected by using a correction information bit. There are a plurality of code types, including an RM code, an LDPC code, a Turbo code, a BCH code, an RS code, a (U|U+V) code, a polar (polar) code, and the like.

2: To-be-coded information: It is the foregoing information bit, and may also be referred to as a to-be-coded element.

3: Codeword: At least one codeword may be obtained by performing channel coding on the information bits. For example, the information bits are grouped based on dimensions of codes to obtain at least one information code group, and the at least one codeword may be obtained by coding the information code group by using the codes. The information code group is in a one-to-one correspondence to the codeword, in other words, each information code group corresponds to one codeword. Specifically, each bit in the codeword is an element (or a bit, and each element is 0 or 1). Based on different code types, a type of the codeword may include a codeword of a systematic code and a codeword of a non-systematic code.

4: Codeword of the systematic code: It means that the codeword includes the information bits. The codeword of the systematic code may be decoded to directly read, from corresponding bit positions, and restore the information bits. A decoding manner is simple.

For example, an information sequence of the information bits is divided into a plurality of information code groups based on a specific length. For example, each information code group includes k bits. A code length of each information code group is set to be k bits. A coder codes the information bits according to a linear rule, and transforms each information code group into an n-bit codeword of a systematic code. A coding rate is k, and a block code is (n, k). n and k are positive integers, and n is greater than k. Each codeword of the systematic code includes k information bits (also referred to as information elements) and r(n-k) check bits (or referred to as check bits).

For example, a codeword with a length of n may be represented by a vector: $C=(C_{n-1}, C_{n-2}, \ldots, C_1, C_0)$. If the block code is (7, 3), in other words, k=3 and r=4 in the codeword, the codeword $C=(C_6, C_5, C_4, C_3, C_2, C_1, C_0)$. $C_6$, $C_5$, and $C_4$ are information bits, and $C_3$, $C_2$, $C_1$, and $C_0$ are check bits. It should be understood that an information bit in a codeword is an information code group corresponding to the codeword. For example, if the information code group is known as (101), it may be determined that $C_6=1$, $C_5=0$, and $C_4=1$. How to generate a check bit is not a focus of discussion in this application, and the check bit may be generated based on an existing mechanism. For example, a check bit in a linear block code is determined based on an information element and a same rule (also referred to as a parity check function), or may be generated based on a new coding method in the future. This is not limited in this application.

5: Codeword of the non-systematic code: It means that the codeword does not include the information bits.

6: Generator matrix: It is a code structure of the code. The generator matrix in embodiments of this application includes a generator matrix of a systematic code and a generator matrix of a non-systematic code. The generator matrix of the systematic code includes a check sub-matrix and an identity sub-matrix. For example, refer to FIG. 1*a*. FIG. 1*a* is a schematic diagram of the generator matrix of the systematic code. H represents the generator matrix of the systematic code. P represents the check sub-matrix. I represents the identity sub-matrix. Similarly, the generator matrix of the non-systematic code means that after the information bits are coded by using the generator matrix of the non-systematic code, the codeword does not include the information bits. The generator matrix of the non-systematic code may be equivalently transformed into a generator matrix of a systematic code through a row-wise operation and column-wise permutation.

It is to be noted that a representation form of the generator matrix of the systematic code shown in FIG. 1*a* is merely an example, and is not limited in embodiments of this application.

7: Code distance: It is also referred to as Hamming distance, and is a quantity of corresponding bits, in which digits are different, of two codewords. For example, a code distance between a codeword (1011) and a codeword (1101) is 2. For another example, a code distance between a codeword (0010) and a codeword (1001) is 3. Generally, the code distance may be used to represent an error correction capability of a channel coding manner. A person skilled in the art may know that a larger code distance indicates a higher error correction capability.

Alternatively, the foregoing code type may be classified into classical algebraic coding and modern coding. Classical algebraic coding includes, for example, a BCH code and an RS code. Modern coding includes, for example, an LDPC code, a Turbo code, and a polar code.

The polar code is used for (U|U+V) channel coding, which is channel coding capable of reaching a Shannon bound theoretically. The polar code is a coding manner proposed based on a channel polarization phenomenon. As shown in FIG. 1*b*, $U_N$ codes are continuously processed by using a (U|U+V) structure on a coding side in a specific manner to obtain $R_N$, so that various subchannels present different reliability. For example, as a code length increases, capacities of some subchannels $W_{N/2}$ approach 1, and capacities of the other subchannels $W_{N/2}$ approach 0. Selecting to transmit information elements $(y_1 \sim y_{N/2})$ on the subchannels $W_{N/2}$ whose capacities approach 1 may implement error-free transmission. Although proved to be a code capable of achieving a channel capacity, the polar code has a non-ideal a polarization effect in case of a medium/small code length. As a result, no matter which decoding manner is used, for example, successive cancellation (SC) or a successive cancellation list (SCL), decoding performance is average. Classical algebraic coding is good in code distance, but there is no low-complexity decoding algorithm for classical algebraic coding.

In view of this, embodiments of this application provide a coding method, which may be applied to a coding apparatus.

The following describes the method provided in embodiments of this application with reference to the accompanying drawings in this specification.

The technical solutions in embodiments of this application may be applied to various mobile communication systems that support channel coding, for example, a universal mobile telecommunication system (UMTS), a worldwide interoperability for microwave access (WiMAX) communication system, a 4th generation (4G) system, a long term evolution (LTE) system, a future 5G (5G) communication system, a new radio (NR) system, an NR-vehicle-to-everything (V2X) system, or another next generation communication system, and may be further applied to a wireless local area network (WLAN) that supports IR-HARQ, for example, may be applied to any one of international Institute of Electrical and Electronics Engineering (IEEE) 802.11-series protocols currently used in the WLAN, for example, applied to an 802.11ay standard, or applied to a next generation standard of 802.11ay. In embodiments of this application, a communication system shown in FIG. 2a is used as an example for description.

Figure 2A:
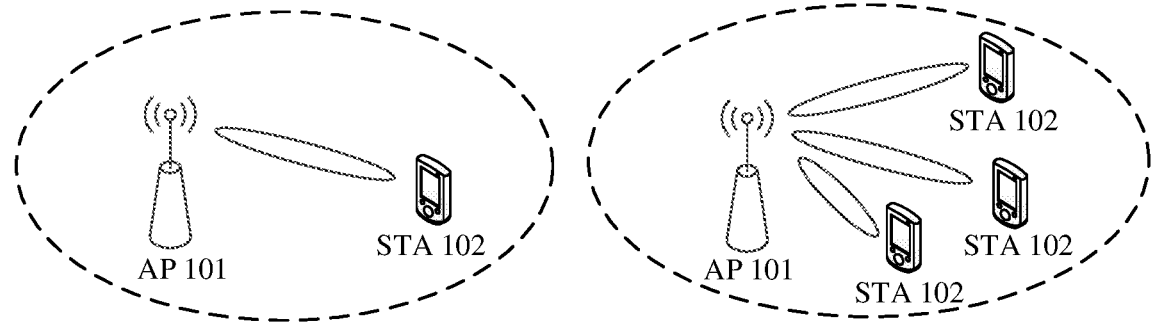
FIG. 2*a* is a schematic diagram of a network architecture according to an embodiment of this application.

As shown in FIG. 2a, the communication system may include one or more basic service sets (BSS). A network node in the basic service set includes an access point (AP) and a station (STA). A transmit end and a receive end in embodiments of this application may be the AP or the STA in the communication system, or may be a chip in the AP or the STA. The solutions in embodiments of this application may be applied to communication between an AP and a STA, or may be applied to communication between APs and between STAs, which may be one-to-one communication, or one-to-many and many-to-many communication. For example, one AP may communicate with one STA (for example, as shown in the left figure in FIG. 2a), an AP may communicate with a plurality of STAs at the same time (as shown in the right figure in FIG. 2a), a plurality of APs may communicate with a plurality of STAs, or a plurality of STAs may communicate with an AP at the same time.

The coding method provided in embodiments of this application may be applied to various communication scenarios, for example, may be applied to one or more of the following communication scenarios: enhanced mobile broadband (eMBB), ultra-reliable and low latency communication (URLLC), machine type communication (MTC), massive machine type communication (mMTC), device-to-device (D2D), vehicle-to-everything (V2X), vehicle-to-vehicle (V2V), and an internet of things (IoT). The coding method provided in embodiments of this application may be applied to a service that requires low-latency and high-reliability transmission, for example, a service like self-driving, industrial automation, traffic safety and control, and a remote service.

The following describes network elements or devices in the communication system shown in FIG. 2a.

The AP is an apparatus with a wireless transceiver function, and may be a directional multi-gigabit (DMG) AP, an enhanced directional multi-gigabit (EDMG) AP, or an AP supporting 60 GHz. However, this is not limited in embodiments of this application. The AP may also be referred to as a base station.

The STA may be an apparatus with a wireless transceiver function, for example, may be a wireless apparatus supporting 60 GHz communication. The STA may also be referred to as a subscriber unit, an access terminal, a mobile station, a remote station, a remote terminal, a mobile device, a user terminal, a terminal, a wireless communication device, a user agent, a user apparatus, or user equipment (UE). Specifically, the STA may be a terminal device, user equipment (UE), a mobile station (MS), a mobile terminal (MT), or the like. Specifically, the terminal may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like.

It is to be noted that in embodiments of this application, the receive end and the transmit end are relative concepts. The receive end may be a device that codes information bits (first information) by using a generator matrix of a systematic (U|U+V)-code designed in this application to obtain coded bits, and sends the coded bits to a peer end. The receive end may be a device that receives the coded bits obtained after coding by using the generator matrix of the systematic (U|U+V)-code designed in this application. For example, the transmit end may be an AP 101 in the left figure in FIG. 2a, and the receive end may be a STA 102 in the left figure in FIG. 2a.

In addition, FIG. 2a is an example framework diagram. A quantity of nodes in FIG. 2a is not limited. In addition to the function nodes shown in FIG. 2a, the communication system may further include other nodes, for example, a gateway device and an application server. This is not limited. In embodiments of this application, the transmit end and the receive end each may be a network node in the communication system, or may be a chip in a network node in the foregoing WLAN communication system.

Figure 2B:
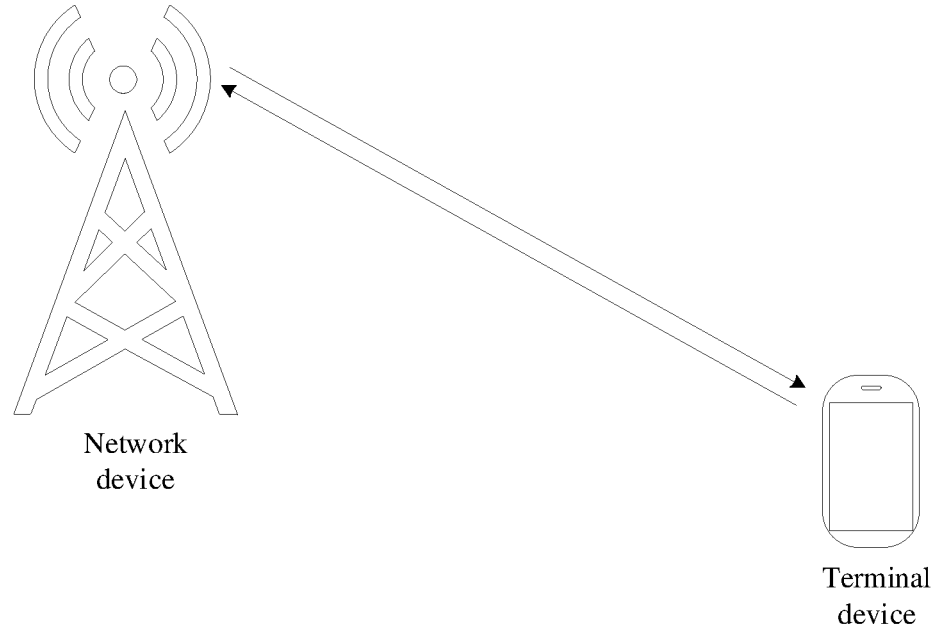
FIG. 2*b* is a schematic diagram of a network architecture according to an embodiment of this application.

Then, refer to FIG. 2b. FIG. 2b shows another communication system according to an embodiment of this application. FIG. 2b includes a network device and a terminal device.

The network device includes, for example, an access network (AN) device, for example, a base station (for example, an access point), which may be a device that communicates with a wireless terminal device through an air interface and one or more cells in an access network. Alternatively, for example, a network device in a vehicle-to-everything (V2X) technology is a road side unit (RSU). The base station may be used to code an information bit and send coded information to the terminal device. Correspondingly, the terminal device receives the information sent by the base station, and decodes the information. Inversely, the terminal device may also be used to code an information bit and send coded information to the base station. Correspondingly, the base station receives the information sent by the terminal device, and decodes the information. The RSU may be a solid infrastructure entity that supports V2X applications, and may exchange information with another entity that supports V2X applications. The network device may also coordinate attribute management of the air interface. For example, the network device may include an evolved base station (NodeB, eNB, or e-NodeB, evolved NodeB) in an LTE system or a long term evolution-advanced (LTE-A) system, may include a next generation nodeB (gNB) in a 5th generation mobile communication technology (5G) NR system (also referred to as an NR system), or may include a central unit (CU) and a distributed unit (DU) in a cloud radio access network (Cloud RAN) system. This is not limited in embodiments of this application.

Alternatively, the network device may include a core network device. The core network device includes, for example, an access and mobility management function (AMF) or a user plane function (UPF). Embodiments of this application mainly relate to the access network. Therefore, the network device below is an access network device unless otherwise specified.

The terminal device includes a device that provides a voice and/or data connectivity for a user. Specifically, the terminal device includes a device that provides a voice for a user, a device that provides data connectivity for a user, or a device that provides a voice and data connectivity for a user. For example, the terminal device may include a hand-held device with a wireless connection function, or a processing device connected to a wireless modem. The terminal device may communicate with a core network through a radio access network (RAN), and exchange a voice or data with the RAN, or perform voice and data interaction with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, hand-held, or computer built-in mobile apparatus, for example, a device like a personal communication service (PCS) phone, a cordless telephone, a session initiation protocol (SIP) phone, a wireless local loop (WLL) station, or a personal digital assistant (PDA). Alternatively, the terminal device includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device, also referred to as a wearable intelligent device or an intelligent wearable device, is a generic term of wearable devices obtained by performing intelligentization designing and development on daily wearing products, for example, glasses, gloves, watches, clothes, and shoes. The wearable device is a portable device that is directly worn on a body or integrated into clothes or an accessory of a user. The wearable device not only is a hardware device but also realizes powerful functions through software support, data interaction, and cloud inter-action. In a broad sense, the wearable intelligent device includes a full-featured and large-sized device capable of implementing all or part of functions without depending on a smartphone, for example, a smartwatch or smart glasses, and includes a device that is dedicated to only one type of application function and needs to collaboratively work with another device such as a smartphone, for example, various smart bands, smart helmets, or smart jewelry used for vital sign monitoring.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In embodiments of this application, the terminal device may further include a relay (relay). Alternatively, it is understood as that any device capable of performing data communication with the base station may be considered as a terminal device.

In embodiments of this application, an apparatus config-ured to implement a function of the terminal device may be the terminal device, or may be an apparatus capable of supporting the terminal device in implementing the function, for example, a chip system. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

The network device works, for example, in an E-UTRA system, an NR system, a next generation communication system, or another communication system.

For example, the network device in FIG. 2b is a base station. The network device corresponds to different devices in different systems. For example, the network device may correspond to an eNB in a 4G system, and correspond to a 5G access network device such as a gNB in a 5G system. Certainly, the technical solutions provided in embodiments of this application may also be applied to a future mobile communication system. Therefore, the network device in FIG. 2b may correspond to a network device in the future mobile communication system. In FIG. 2b, the network device is, for example, a base station. Actually, based on the foregoing descriptions, the network device may alternatively be a device such as an RSU. In addition, in FIG. 2b, the terminal device is, for example, a mobile phone. Actually, it may be learned from the foregoing descriptions of the terminal device that the terminal device in embodiments of this application is not limited to the mobile phone.

Each network element shown in FIG. 2a and FIG. 2b, for example, the AP, the STA, the base station, or the terminal device, may use a composition structure shown in FIG. 3 or include components shown in FIG. 3. FIG. 3 is a schematic diagram of composition of an apparatus 300 according to an embodiment of this application. For example, the apparatus 300 may be an AP, or a chip or a system-on-a-chip in an AP. Similarly, the network device and the terminal device shown in FIG. 2b may use the composition structure shown in FIG. 3 or include the components shown in FIG. 3. For example, the apparatus 300 may be a chip or a system-on-a-chip in the network device or the terminal device. As shown in FIG. 3, the apparatus 300 may include a processor 301, a communication line 302, and a transceiver circuit 303. Further, the apparatus 300 may include a memory 304. The processor 301, the memory 304, and the transceiver circuit 303 may be connected through the communication line 302.

The processor 301 may be a central processing unit (CPU), a general purpose processor, a network processor (NP), a digital signal processor (DSP), a microprocessor, a microcontroller, a programmable logic device (PLD), or any combination thereof. The processor 301 may alternatively be another apparatus with a processing function, for example, a circuit, a component, or a software module. The processor 301 may have functions such as coding, modulation, demodulation, and decoding.

The communication line 302 is configured to transmit information between the components in the apparatus 300.

The transceiver circuit 303 is configured to communicate with another device or another communication network. The another communication network may be an Ethernet, a radio access network (RAN), a wireless local area network (WLAN), or the like. The transceiver circuit 303 may be a radio frequency module or any apparatus capable of implementing communication. In this embodiment of this application, only an example in which the transceiver circuit 303 is a radio frequency module is used for description. The radio frequency module may include an antenna, a radio frequency circuit, and the like. The radio frequency circuit may include a radio frequency integrated chip, a power amplifier, and the like.

The memory 304 is configured to store instructions and systematic code generation matrices of M mother codes. M is a positive integer greater than 1. The instruction may be a machine program.

The memory 304 may be a read-only memory (ROM) or another type of static storage device capable of storing static information and/or instructions, may be a random access memory (RAM) or another type of dynamic storage device capable of storing information and/or instructions, or may be an electrically erasable programmable read-only memory (EEPROM), a compact disc read-only memory (CD-ROM) or another optical disk storage, an optical disc storage, or a magnetic disk storage medium or another magnetic storage device. The optical disc storage includes a compact disc, a laser disc, an optical disc, a digital versatile disc, a Blu-ray disc, and the like.

It is to be noted that the memory 304 may exist independently of the processor 301, or may be integrated with the processor 301. The memory 304 may be configured to store instructions, program code, some data, or the like. The memory 304 may be located inside the apparatus 300, or may be located outside the apparatus 300. This is not limited. The processor 301 is configured to execute the instructions stored in the memory 304, to implement a coding method provided in the following embodiments of this application.

In an example, the processor 301 may include one or more CPUs, for example, a CPU 0 and a CPU 1 in FIG. 3.

In an optional implementation, the apparatus 300 includes a plurality of processors. For example, in addition to the processor 301 in FIG. 3, the apparatus 300 may further include a processor 307.

In an optional implementation, the apparatus 300 further includes an output device 305 and an input device 306. For example, the input device 306 is a device such as a keyboard, a mouse, a microphone, or a joystick. The output device 305 is a device such as a display or a speaker (speaker).

It is to be noted that the apparatus 300 may be a desktop computer, a portable computer, a network server, a mobile phone, a tablet computer, a wireless AP, an embedded device, a chip system, or a device of a structure similar to that in FIG. 3. In addition, the composition structure shown in FIG. 3 does not constitute a limitation on the apparatus. In addition to the components shown in FIG. 3, the apparatus may include more or fewer components than those shown in the figure, or some components may be combined, or different component arrangements may be used.

In this embodiment of this application, the chip system may include a chip, or may include a chip and another discrete component.

The following describes the coding method provided in embodiments of this application with reference to the communication system shown in FIG. 2a. Each device in the following embodiments may include the components shown in FIG. 3. For actions, terms, and the like used in embodiments of this application, reference may be made to each other. In embodiments of this application, names of messages for interaction between devices, names of parameters in messages, or the like are merely examples. Other names may alternatively be used during specific implementation. This is not limited.

FIG. 4 is a flowchart of a coding method according to an embodiment of this application. The method may be performed by a coding apparatus. The coding apparatus may be the AP or the STA in FIG. 2a, or the network device or the terminal device in FIG. 2b. As shown in FIG. 4, the method may include the following steps.

Step 401: Determine first information. The first information is a to-be-coded element, that is, an information bit.

Step 402: Code the first information by using a preset generator matrix of a systematic (U|U+V)-code to obtain second information.

The following specifically describes a process of generating the generator matrix of the systematic (U|U+V)-code.

Refer to FIG. 5. FIG. 5 is a schematic diagram of a method for generating a generator matrix of a systematic code of a (U|U+V)-code. As shown in FIG. 5, a (U+V) code is obtained by performing exclusive or $\oplus$ calculation on a U code and a V code. Then, the U code and the (U+V) code are combined to obtain a tree-diagram (U|U+V)-code. That is, multiple protections for the U code may be formed by superimposing the U code on the V code. For example, important information may be placed in the U code, and relatively unimportant information may be placed in the V code, so as to form unequal error protection.

Specifically, the U code and the V code may be BCH codes or RS codes. This is not limited in this embodiment of this application. The following uses the BCH code as an example for description.

The BCH code used herein to construct the (U|U+V)-code is referred to as a mother code. It is set that a dimension of the U code is Ku, a dimension of the V code is Kv, and a code length n of the U code is the same as that of the V code. The first information is a one-dimensional row vector, and has a code length of Ku+Kv. The first information is grouped based on the dimension of the U code and the dimension of the V code, to obtain a first code group (denoted as Mu) and a second code group (denoted as Mv). A code length of the first code group is Ku, and a code length of the second code group is Kv. The first information is coded based on the (U|U+V)-code, to obtain that the second information= (Mu·Gu), {(Mu·Gu)+(Mv·Gv)}=(Mu·Gu), {(Mu·Gu)+ (Mv·Gv)}=(Mu, Mv)·$G_{U\text{-}UV}$.

Gu represents the U code. Gv represents the V code. It is clear that the second information obtained in the foregoing manner is a non-systematic code.

In conclusion, a non-systematic coding-based generator matrix of the (U|U+V)-code (referred to as a generator matrix of a non-systematic (U|U+V)-code) may be represented in the following form:

$$G_{U-UV} = \begin{bmatrix} G_U & G_U \\ 0 & G_V \end{bmatrix} \qquad \text{(Matrix 1)}$$

The matrix 1 represents the generator matrix of the non-systematic (U|U+V)-code.

Systematic-coding-based generator matrices of the U code and the V code are denoted as Gu' and Gv' respectively, that is, $G'_U=[I_U:P_U]$ and $G'_V=[I_V:P_V]$. $I_U$ and $I_V$ represent identity sub-matrices of the U code and the V code respectively. $P_U$ and $P_V$ represent check parts of the U code and the V code respectively. For ease of description below, $I_U$ is referred to as a first identity sub-matrix, $I_V$ is referred to as a second identity sub-matrix, $P_U$ is referred to as a first check sub-matrix, and $P_V$ is referred to as a second check sub-matrix.

$G'_U=[I_U:P_U]$ and $G'_V=[I_V:P_V]$ are respectively substituted into Gu and Gv to obtain:

$$G_{U-UV} = \begin{bmatrix} I_U:P_U & I_U:P_U \\ 0 & I_V:P_V \end{bmatrix} \qquad \text{(Matrix 2)}$$

It is to be noted that a codeword obtained by performing channel coding by using the matrix 2 is still not a codeword of a systematic code because the codeword can only reflect Mu (Mu·$I_U$+Mv·o) but cannot reflect Mv.

Next, further processing is performed: A generator matrix of a systematic code of the (U|U+V)-code is obtained through Gaussian elimination and the matrix 2, and the following form is obtained through a row-wise transformation operation:

$$G'_{U-UV} = \begin{bmatrix} I_U:P_U & I_U:P_U \\ 0 & I_V:P_V \end{bmatrix} \sim \begin{bmatrix} I_U:P_U & 0:P' \\ 0 & I_V:P_V \end{bmatrix} \qquad \text{(Matrix 3)}$$

$G'_{U-UV}$ represents the generator matrix of the systematic code of the (U|U+V)-code. $P'(1:k_v,:)=P_U(1:k_v,:)+P_V$; $P'((1+k_v):k_u,:)=P_U((1+k_v):k_u,:)$. $X(1:k_v,:)$ represents that a first row to a $Kv^{th}$ row of an X matrix are selected. $X(y:k_u,:)$ represents that a $y^{th}$ row to a $Ku^{th}$ row of the X matrix are selected. The X matrix may be $P_U$ or $P_V$.

In conclusion, it may be learned that the generator matrix of the systematic (U|U+V)-code includes the first identity sub-matrix of the U code and the second identity sub-matrix of the V code. Elements in a plurality of columns corresponding to the first identity sub-matrix are all 0. Elements in a plurality of columns corresponding to the second identity sub-matrix are also all 0.

The matrix 3 is the preset generator matrix of the systematic (U|U+V)-code.

With still reference to the foregoing matrix 3 as an example, the first information is coded by using the generator matrix of the systematic code shown in the matrix 3 in the following manner:

$$c' =$$

$$mG'_{U-UV} = (m_U, m_V) \begin{bmatrix} I_U:P_U & 0:P' \\ 0 & I_V:P_V \end{bmatrix} = (m_U, m_U P_U, m_V, m_U P' + m_V P_V)$$

c' represents the second information.

It may be learned that the second information c' includes Mu and Mv, that is, all information bits of the first information. That is, the second information c' is a codeword of a systematic code.

In the foregoing coding manner, decoding complexity is low, a code distance is good, and a design requirement of a medium-length code is met. In addition, the obtained codeword is a systematic code, so that high-reliability and low-delay transmission of the information bits may be implemented, and convenience of engineering implementation is improved. Moreover, in this manner, a plurality of code lengths and coding rates may be flexibly adapted only by storing a generator matrix of a systematic code of a mother code, so that this manner is lower in storage overhead than a coding manner of storing a multidimensional generator matrix with a length n.

The foregoing code constructed by using the (U|U+V) structure once is referred to as a (U|U+V)-code of one layer. In this embodiment of this application, the (U|U+V)-code may be further extended from one layer to a plurality of layers. For example, two U-UV-codes of one layer are considered as a U code and V code, and a U-UV code of two layers may be obtained by performing coding by using the structure again. By analogy, more BCH mother codes are used and superimposed layer by layer, so that a multi-layer U-UV code may be constructed. Each time a quantity of layers increases by one layer, a total code length doubles. A plurality of code lengths and coding rates may be flexibly adapted.

In view of this, an embodiment of this application further provides another coding method. Refer to FIG. 6. FIG. 6 is a flowchart of another coding method according to an embodiment of this application. The method may be performed by a coding apparatus. The coding apparatus may be the AP or the STA in FIG. 2a, or the network device or the terminal device in FIG. 2b. As shown in FIG. 6, the method may include the following steps.

Step 601: Determine first information. The first information is a to-be-coded element, that is, an information bit.

Step 602: Determine generator matrices of systematic codes of M mother codes, and construct generator matrices of systematic codes of a (U|U+V)-code of H layers based on the generator matrices of the systematic codes of the M mother codes.

FIG. 7 shows a structure of the (U|U+V)-code of H layers. $U_i^{(h)}$ represents an $i^{th}$ code at an $h^{th}$ layer, i=1, 2, . . . , $2^{H-h}$, with a code length of $2^h n$. A code at a $0^{th}$ layer is a BCH code, and requires totally $2^H$ BCH mother codes, that is, M=2H, and a total code length is $2^H n$. A relationship between codes at layers is $U_i^{(h)}=(U_{2i-1}^{(h-1)}|U_{2i-1}^{(h-1)}+U_{2i}^{(h-1)})$.

In this embodiment of this application, $U_{2i-1}^{(h-1)}$ may be referred to as a U code, and $U_{2i}^{(h-1)}$ may be referred to as a V code. $U_{2i-1}^{(h-1)}$ and $U_{2i}^{(h-1)}$ may form (U|U+V)-$U_i^{(h)}$ by using the method shown in FIG. 5.

For ease of description below, $U_i^{(h)}$ is collectively used instead of the U code and the V code to represent the $i^{th}$ code at the $h^{th}$ layer. The following describes a method for extending generator matrices of systematic (U|U+V)-codes of one layer to generator matrices of systematic (U|U+V)-codes of H-layers.

Refer to FIG. 8. FIG. 8 shows a structure of the generator matrices of the systematic (U|U+V)-codes of the H layers. $G'^{(h)}_i$ represents a generator matrix of a systematic code of the $i^{th}$ code ($U^{(h)}_i$) at the $h^{th}$ layer, i=1, 2, . . . , $2^{H-h}$, with a code length of $2^h$n. A code at a $0^{th}$ layer is a BCH code, and requires totally $2^H$ BCH mother codes $U^{(0)}_i$.

Next, $G'^{(h-1)}_{2i}$ and $G'^{(h-1)}_{2i-1}$ are sequentially invoked with reference to a relationship shown in FIG. 8 to construct $G'^{(h)}_i$. Specifically, based on an inverse binary tree in FIG. 8, a generator matrix corresponding to a node at a next layer is generated each time by using generator matrices of systematic codes of two adjacent nodes at an adjacent layer, and then equivalent transformation is performed on the generator matrix of the node to obtain the following generator matrix $G'^{(h)}_i$ of the systematic code. For a specific method for generating the generator matrix of the systematic code, refer to the related descriptions in the embodiment shown in FIG. 4. Details are not described herein again.

$$G'^{(h)}_i = \begin{bmatrix} G'^{(h-1)}_{2i-1} & G'^{(h-1)}_{2i-1} \\ 0 & G'^{(h-1)}_{2i} \end{bmatrix} \sim \begin{bmatrix} G'^{(h-1)}_{2i-1} & P'^{(h-1)}_{2i-1} \\ 0 & G'^{(h-1)}_{2i} \end{bmatrix}$$

$$P'^{(h-1)}_{2i-1}(1{:}k_v, :) = P'^{(h-1)}_{2i-1}(1{:}k_v, :) + G'^{(h-1)}_{2i},$$

$$P'^{(h-1)}_{2i-1}((1+k_v){:}k_u, :) = G'^{(h-1)}_{2i-1}((1+k_v){:}k_u, :).$$

The foregoing process is repeated until $G'^H_1$ is obtained. $G'^H_1$ is the generator matrices of the systematic (U|U+V)-codes of the H layers.

In conclusion, it may be obtained that a generator matrix of a systematic code of the $i^{th}$ code at the $h^{th}$ layer in a (U|U+V)-code of H layers consists of a generator matrix of a systematic code (denoted as a first systematic code matrix) of a $2i^{th}$ code at an $(h-1)^{th}$ layer in the (U|U+V)-code of H layers and a generator matrix of a systematic code (denoted as a second systematic code matrix) of a $(2i-1)^{th}$ code at the $(h-1)^{th}$ layer. In addition, a plurality of elements that are in a same column as an identity sub-matrix in the first systematic code matrix and that are in the generator matrix of the systematic code of the $i^{th}$ code at the $h^{th}$ layer are all 0, and a plurality of elements that are in a same column as an identity sub-matrix in the second systematic code matrix and that are in the generator matrix of the systematic code of the $i^{th}$ code at the $h^{th}$ layer are all 0.

It is to be noted that step 602 is an optional step, and is merely for ease of understanding. In some possible scenarios, the generator matrices of the systematic (U|U+V)-codes of the H layers may be preset, and step 602 does not need to be performed each time.

Step 603: Code the first information by using the generator matrices ($G'^H_1$) of the systematic (U|U+V)-codes of the H layers to obtain second information. The second information is a codeword of a systematic code.

According to the foregoing design, a (U|U+V)-code with a flexible length may be constructed. Compared with separately storing a generator matrix of a (U|U+V)-code of H layers, this method is lower in storage overhead and easier to implement.

The following describes a third coding method provided in an embodiment of this application. Refer to FIG. 9. FIG. 9 is a flowchart of another coding method according to an embodiment of this application. The method may be performed by a coding apparatus. The coding apparatus may be the AP or the STA in FIG. 2a, or the network device or the terminal device in FIG. 2b. As shown in FIG. 9, the method may include the following steps.

Step 901: Determine first information. The first information is a to-be-coded element, that is, an information bit.

Specifically, the first information includes a first code group and a second code group. A code length of the first code group is Ku, which is the same as a dimension of a U code. A code length of the second code group is Ku, which is the same as a dimension of a V code.

Step 902: Code the first code group based on a generator matrix of a systematic code of the U code to obtain a first codeword, and code the second code group based on a generator matrix of a systematic code of the V code to obtain a second codeword. A code length n of the U code is the same as that of the V code.

Step 903: Construct codewords of systematic (U|U+V)-codes of one layer based on the first codeword and the second codeword.

Figure 10:
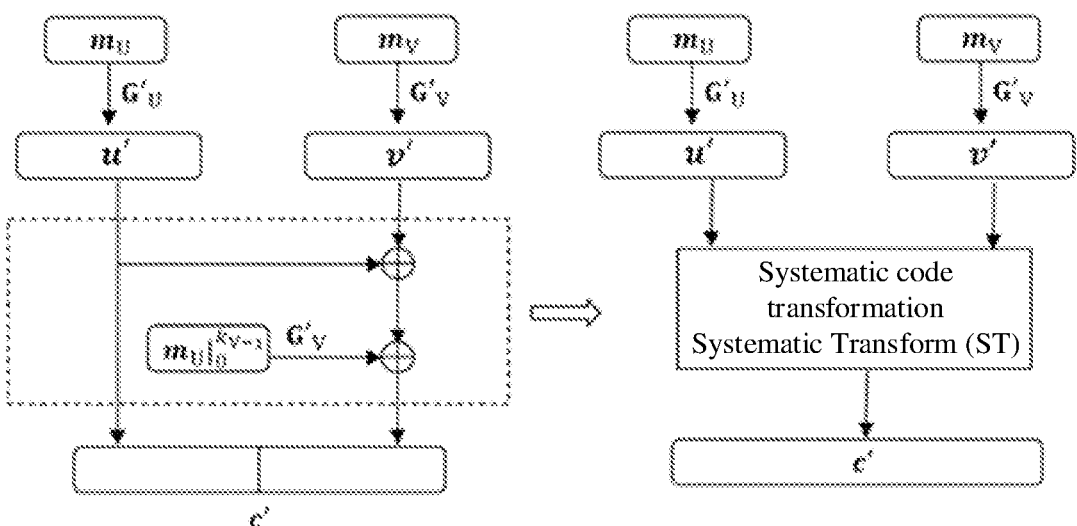
FIG. 10 is a flowchart of codewords of systematic (U|U+V)-codes of one layer according to an embodiment of this application.

Refer to FIG. 10. FIG. 10 shows a structure of the codewords of the systematic (U|U+V)-codes of one layer. Specifically, the first codeword is $u'=m_U G'_U$, and the second codeword is $v'=m_V G'_V$. mu represents the first code group, and $m_V$ represents the second code group, and my represents the second code group. $G'_U$ represents the generator matrix of the systematic code of the U code. $G'_V$ represents the generator matrix of the systematic code of the V code.

A preset one-layer (U|U+V)-coding operation is performed based on the first codeword u' and the second codeword v' to obtain second information. The second information is a codeword of a systematic code. The second information meets:

$$c'=(u', u'+v'+m_U|_0^{k_V-1}G'_V).$$

c' represents the second information. $m_U|_0^{k_V-1}$ represents that first to $K_{(v=1)}^{th}$ elements of $m_U$ are selected.

It may be learned that, compared with a non-systematic form, for a systematic code, in addition to superimposing the u code and the v code, only codewords obtained by multiplying first $k_V$ bits of the u code by the generator matrix of the systematic code of the V code need to be superimposed, to obtain the codeword of the systematic code. An operation in a dashed box in FIG. 10 is the preset (U|U+V)-coding operation, and may be referred to as systematic code transformation (Systematic Transform, ST). For ease of description below, performing the preset (U|U+V)-coding operation may be referred to as performing an ST operation.

Based on the foregoing manner, in this embodiment of this application, the codewords of the systematic (U|U+V)-codes of one layer may be further extended to codewords of systematic (U|U+V)-codes of a plurality of layers.

Figure 11:
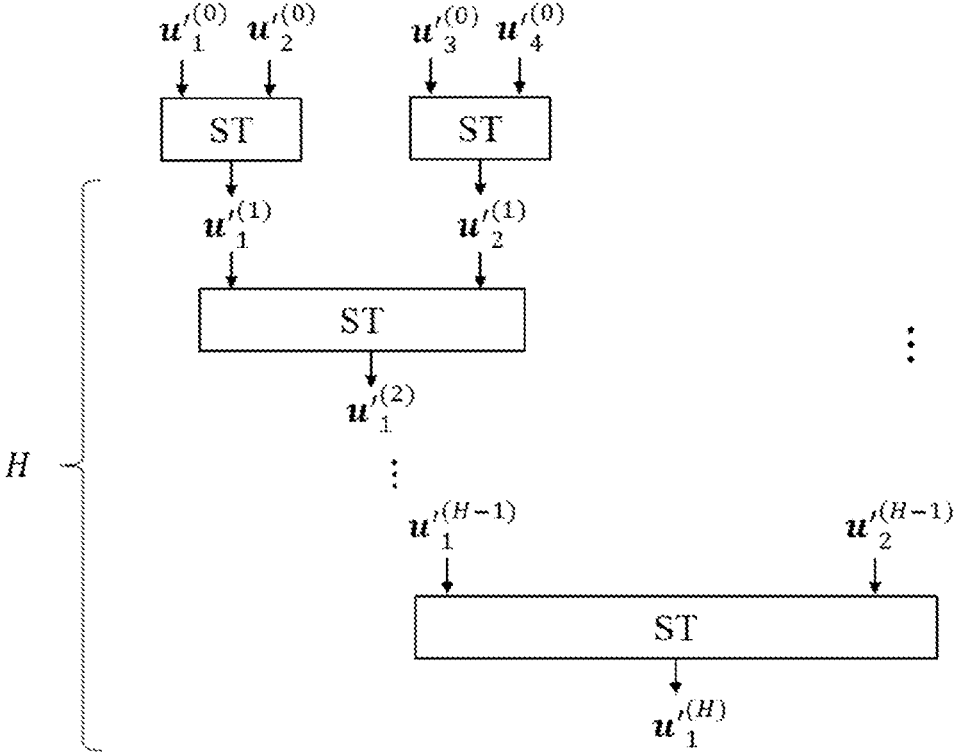
FIG. 11 is a flowchart of codewords of systematic (U|U+V)-codes of H layers according to an embodiment of this application.

Refer to FIG. 11. FIG. 11 shows a structure of codewords of systematic (U|U+V)-codes of H layers. The following specifically describes, with reference to FIG. 10, a procedure of constructing the codewords of the systematic (U|U+V)-codes of the H layers.

Step 1: Determine generator matrices of systematic codes of M mother codes. Code lengths n of the M mother codes are the same.

Specifically, the codewords of the systematic (U|U+V)-codes are of the H layers are subsequently constructed based on the M mother codes. H is an integer greater than or equal to 1, $M=2^H$.

As described above, the mother code herein may be a BCH code or an RS code. The following still uses the BCH code as an example for description.

Step 2: Group the first information based on dimensions of the generator matrices of the systematic codes of the M mother codes to obtain M code groups. A dimension of an $i^{th}$ code group is the same as that of a generator matrix of a systematic code of an $i^{th}$ mother code.

Step 3: Perform the ST operation based on the first information and the generator matrices of the systematic codes of the M mother codes, to construct a codeword of a systematic code at a $0^{th}$ layer.

For a specific operation in step 3, see the following expression:

$$u'^{(0)}_i = ST(u_{2i-1}^{(0)} G'_{2i-1}^{(0)}, u_{2i-1}^{(0)} G'_{2i}^{(0)})$$

$u'^{(H)}_i$ represents a codeword of an $i^{th}$ systematic code at an $H^{th}$ layer. $G'^{(0)}_i$ represents the generator matrix of the systematic code of the $i^{th}$ mother code. $U^{(0)}_i$ represents the $i^{th}$ code group in the first information, i=1, 2, . . . , $2^{H-h}$, and a dimension of the $i^{th}$ code group is the same as that of $G'^{(0)}_i$.

Step 4: Invoke two consecutive inputs of a same layer in a result of the previous step to perform the ST operation to obtain an output of a next layer.

Specifically, $G'_{2i-1}^{(h-1)}$ and $G'_{2i}^{(h-1)}$ are invoked to perform the ST operation to construct $G'^{(h)}_i$.

Step 4 is repeated based on an inverse binary tree shown in FIG. 11 until $u'^H_1$ is obtained. Specifically, two consecutive inputs of the same layer for the ST operation are invoked each time to perform the ST operation to obtain the output of the next layer.

$u'^H_1$ is a final coding result, that is, the codewords of the systematic (U|U+V)-codes of the H layers.

According to the foregoing manner, different code lengths and coding rates may be flexibly adapted only by storing a generator matrix of a systematic code of a mother code. Compared with a manner of storing a generator matrix of a (U|U+V)-code, this application has the advantage that generation of the generator matrix of the (U|U+V)-code may be avoided, so that calculation complexity is reduced, and in addition, storage overhead may be reduced.

The foregoing mainly describes the solutions provided in embodiments of this application from a perspective of interaction between nodes. It can be understood that, to implement the foregoing functions, each node such as a key management network element includes a corresponding hardware structure and/or software module for implementing each function. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the key management network element may be divided into function modules based on the foregoing method examples. For example, the function modules may be obtained through division based on corresponding functions, or two or more functions may be integrated into one processing module. The integrated module may be implemented in a hardware form, or in a form of a software function module. It is to be noted that, in embodiments of this application, module division is an example, and is merely a logical function division. During actual implementation, another division manner may be used.

Figure 12:
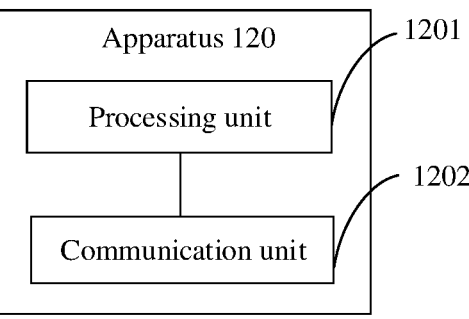
FIG. 12 is a schematic diagram of a structure of an apparatus according to an embodiment of this application.

FIG. 12 is a diagram of a structure of an apparatus 120. The apparatus 120 may be a coding apparatus, a chip in a coding apparatus, a system-on-a-chip, another apparatus capable of implementing a function of the coding apparatus in the foregoing method, or the like. The apparatus 120 may be configured to perform the function of the coding apparatus in the foregoing method embodiment. Alternatively, the apparatus 120 may be a decoding apparatus, a chip in the decoding apparatus, a system-on-a-chip, another apparatus capable of implementing a function of a decoding apparatus in the foregoing method, or the like. The apparatus 120 may be configured to perform the function of the decoding apparatus in the foregoing method embodiment. In a possible implementation, the apparatus 120 shown in FIG. 12 includes a processing unit 1201 and a communication unit 1202.

In an embodiment, the processing unit 1201 is configured to: determine first information, where the first information is a to-be-coded element; and code the first information by using a preset generator matrix of a systematic (U|U+V)-code to obtain second information. The preset generator matrix of the systematic (U|U+V)-code includes a first identity sub-matrix of a U code and a second identity sub-matrix of a V code. A plurality of elements in a same column as the first identity sub-matrix are all 0. A plurality of elements in a same column as the second identity sub-matrix are all 0.

In a possible design, a dimension of the U code is Ku. A dimension of the V code is Kv. A code length n of the U code is the same as that of the V code. The first information includes a first code group and a second code group. A code length of the first code group is Ku. A code length of the second code group is Kv.

In a possible design, the preset generator matrix of the systematic (U|U+V)-code is obtained by substituting a generator matrix of a systematic code of the U code and a generator matrix of a systematic code of the V code based on a generator matrix of a (U|U+V) structure and performing equivalent transformation. The generator matrix of the systematic code of the U code includes the first identity sub-matrix and a first check sub-matrix. The generator matrix of the systematic code of the V code includes the second identity sub-matrix and a second check sub-matrix.

In a possible design, the preset generator matrix of the systematic (U|U+V)-code may meet:

$$G'_{U|U+V} = \begin{bmatrix} I_U{:}P_U & 0{:}P' \\ 0 & I_V{:}P_V \end{bmatrix}$$

$G'_{U|U+V}$ represents the preset generator matrix of the systematic (U|U+V)-code. $I_U$ represents the first identity sub-matrix. $I_V$ represents the second identity sub-matrix. $P_U$ represents the first check sub-matrix. $P_V$ represents the second check sub-matrix.

P' meets P'(1:$k_v$,:)=$P_U$(1:$k_v$,:)+$P_V$,P'((1+$k_v$):$k_u$,:)=$P_U$((1+$k_v$):$k_u$,:). X(1:$k_v$,:) represents a first row to a Kv$^{th}$ row of a matrix X. X is P' or $P_U$.

For example, the U code and the V code may be BCH codes or Reed-Solomon RS codes with a same code length.

In another embodiment, the processing unit 1201 is configured to: determine first information, where the first information is a to-be-coded element; and code the first information by using generator matrices of systematic (U|U+V)-code of H layers to obtain second information. The generator matrices of the systematic (U|U+V)-codes of H layers are constructed based on generator matrices of systematic codes of M mother codes. Code lengths n of the M mother codes are the same. H is an integer greater than or equal to 1, and M=$2^H$. A generator matrix of an $i^{th}$ systematic code at an $h^{th}$ layer in a (U|U+V)-code of H layers consists of a generator matrix of a $2i^{th}$ systematic code at an $(h-1)^{th}$ layer in the (U|U+V)-code of H layers and a generator matrix of a $(2i-1)^{th}$ systematic code at the $(h-1)^{th}$ layer. A generator matrix of an $i^{th}$ systematic code at a first layer in the (U|U+V)-code of H layers consists of a generator matrix of a systematic code of a $2i^{th}$ mother code in the M mother codes and a generator matrix of a systematic code of a $(2i-1)^{th}$ mother code. h is an integer whose value ranges from 1 to H, and i is an integer whose value ranges from 1 to $2^{H-h}$.

In a possible design, the generator matrix of the $i^{th}$ systematic code includes an identity sub-matrix of the generator matrix of the systematic code of the $2i^{th}$ mother code and an identity sub-matrix of the generator matrix of the systematic code of the $(2i-1)^{th}$ mother code. Elements in a plurality of columns corresponding to the identity sub-matrix of the generator matrix of the systematic code of the $2i^{th}$ mother code are 0. Elements in a plurality of columns corresponding to the identity sub-matrix of the generator matrix of the systematic code of the $(2i-1)^{th}$ mother code are 0. A dimension of the $2i^{th}$ mother code is Ku. A dimension of the $(2i-1)^{th}$ mother code is Kv. A code length n of the $2i^{th}$ mother code is the same as that of the $(2i-1)^{th}$ mother code. The first information includes M code groups. M is a positive integer greater than 0. A code length of a $(2i-1)^{th}$ code group in the M code groups is Ku. A code length of a $2i^{th}$ code group in the M code groups is Kv.

For example, the M mother codes may be BCH codes or Reed-Solomon RS codes.

In still another embodiment, the processing unit 1201 is configured to: determine first information, where the first information is a to-be-coded element, and the first information includes a first code group and a second code group; code the first code group by using a generator matrix of a systematic code of a U code to obtain a first codeword; code the second code group by using a generator matrix of a systematic code of a V code to obtain a second codeword, where a dimension of the U code is Ku, a dimension of the V code is Kv, a code length n of the U code is the same as that of the V code, a code length of the first code group is Ku, and a code length of the second code group is Kv; and perform a preset (U|U+V)-coding operation based on the first codeword and the second codeword to obtain second information. The second information is a codeword of a systematic code.

In a possible design, the second information is a (U|U+V)-code of one layer. The second information may meet:

$$c'=(u',u'+v'+m_U|_0^{k_V-1}G'_V)$$

c' represents the second information. u' represents first partial information. v' represents second partial information. mu represents the first code group. $m_U|_0^{k_V-1}$ represents that first to $(k_V-1)^{th}$ elements of the first code group are selected. $G'_V$ represents a second identity sub-matrix.

In a possible design, the generator matrix of the systematic code of the U code includes a first identity sub-matrix and a first check sub-matrix. The generator matrix of the systematic code of the V code includes the second identity sub-matrix and a second check sub-matrix.

The U code and the V code may be BCH codes, Reed-Solomon RS codes or the like, or may certainly be other codewords.

Specifically, all related content of the steps in the foregoing method embodiment shown in FIG. 4, FIG. 6, or FIG. 9 may be cited in function descriptions of the corresponding function modules. Details are not described herein again. The apparatus 120 may be the coding apparatus or the decoding apparatus configured to perform the method shown in FIG. 4, FIG. 6, or FIG. 9. Therefore, an effect the same as that of the foregoing method may be achieved.

In this embodiment, the apparatus 120 may further be presented in a form of function modules obtained through division in an integrated manner. The "function module" herein may be an application-specific integrated circuit (application-specific integrated circuit, ASIC), a circuit, a processor and a memory that execute one or more software or firmware programs, an integrated logic circuit, and/or another component capable of providing the foregoing functions. In a simple embodiment, a person skilled in the art may figure out that a function/implementation process of the processing unit 1201 in the apparatus 120 may be implemented by the processor by invoking computer-executable instructions stored in the memory. A function/implementation process of the communication unit 1202 in FIG. 12 may be implemented by using a communication interface. For example, in still another possible implementation, the apparatus 120 may use the composition structure shown in FIG. 3.

Optionally, the computer-executable instructions in this embodiment of this application may also be referred to as application code. This is not specifically limited in this embodiment of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Drive, SSD)), or the like.

The various illustrative logical units and circuits described in embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may be any conventional processor, controller, microcontroller, or state machine. The processor may alternatively be implemented by a combination of computing apparatuses, for example, a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by the processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may be connected to the processor, so that the processor may read information from the storage medium and write information to the storage medium. Alternatively, the storage medium may be integrated into the processor. The processor and the storage medium may be disposed in an ASIC.

The computer program instructions may alternatively be loaded onto the computer or another programmable data processing device, so that a series of operating steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations, or equivalents that cover the scope of this application. Clearly, a person skilled in the art may make various modifications and variations to this application without departing from the scope of this application. This application is intended to cover these modifications and variations of this application provided that they fall within the scope of the claims of this application and their equivalent technologies.

What is claimed is:

1. A method, comprising:

determining first information, wherein the first information comprises a to-be-coded element; and coding the first information using a preset generator matrix of a systematic (U|U+V)-code to obtain second information, wherein the preset generator matrix of the systematic (U|U+V)-code comprises a first identity sub-matrix of a U code and a second identity sub-matrix of a V code, a plurality of elements in a same column as the first identity sub-matrix are all 0, and a plurality of elements in a same column as the second identity sub-matrix are all 0; and transmitting the second information;

wherein the U code and the V code are BCH codes or reed solomon (RS) codes;

wherein the preset generator matrix of the systematic (U|U+V)-code is obtained by substituting a generator matrix of a systematic code of the U code and a generator matrix of a systematic code of the V code based on a generator matrix of a (U|U+V) structure and performing equivalent transformation;

wherein the generator matrix of the systematic code of the U code comprises the first identity sub-matrix and a first check sub-matrix, and the generator matrix of the systematic code of the V code comprises the second identity sub-matrix and a second check sub-matrix; and wherein the preset generator matrix of the systematic (U|U+V)-code meets:

$$G'_{(U|U+V)} = \begin{bmatrix} I_U{:}P_U & 0{:}P' \\ 0 & I_V{:}P_V \end{bmatrix},$$

wherein $G'_{(U|U+V)}$ represents the preset generator matrix of the systematic (U|U+V)-code; $I_U$ represents the first identity sub-matrix; $I_V$ represents the second identity sub-matrix; $P_U$ represents the first check sub-matrix; $P_V$ represents the second check sub-matrix; and P' meets $P'(1{:}k_v{:})=P_U(1{:} k_v{:})+P_V$, $P'((1+k_v){:}k_u)=P_U((1+k_v){:} k_u{:})$, $X(1{:}k_V{:})$ represents a first row to a $Kv^{th}$ row of a matrix X, and X is P' or $P_U$.

2. The method according to claim 1, wherein a code length n of the U code is the same as that of the V code; and wherein the first information comprises a first code group and a second code group.

3. The method according to claim 1, wherein the method is performed by a terminal device.

4. The method according to claim 1, wherein the method is performed by an access device.

5. The method according to claim 1, wherein the U code and the V code are BCH codes with a same code length.

6. The method according to claim 1, wherein the U code and the V code are RS codes with a same code length.

7. The method according to claim 1, wherein the U code and the V code have a same code length.

8. An apparatus, comprising:

at least one processor; and a non-transitory computer readable storage medium storing a program that is executable by the at least one processor, the program including instructions to:

determine first information, wherein the first information comprises a to-be-coded element; and code the first information by using a preset generator matrix of a systematic (U|U+V)-code to obtain second information, wherein the preset generator matrix of the systematic (U|U+V)-code comprises a first identity sub-matrix of a U code and a second identity sub-matrix of a V code, a plurality of elements in a same column as the first identity sub-matrix are all 0, and a plurality of elements in a same column as the second identity sub-matrix are all 0; and transmit the second information;

wherein the U code and the V code are BCH codes or reed solomon (RS) codes;

wherein the preset generator matrix of the systematic (U|U+V)-code is obtained by substituting a generator matrix of a systematic code of the U code and a generator matrix of a systematic code of the V code based on a generator matrix of a (U|U+V) structure and performing equivalent transformation;

wherein the generator matrix of the systematic code of the U code comprises the first identity sub-matrix and a first check sub-matrix, and the generator matrix of the systematic code of the V code comprises the second identity sub-matrix and a second check sub-matrix; and wherein the preset generator matrix of the systematic (U|U+V)-code meets:

$$G'_{(U|U+V)} = \begin{bmatrix} I_U{:}P_U & 0{:}P' \\ 0 & I_V{:}P_V \end{bmatrix},$$

wherein $G'_{(U|U+V)}$ represents the preset generator matrix of the systematic (U|U+V)-code; In represents the first identity sub-matrix; $I_V$ represents the second identity sub-matrix; $P_U$ represents the first check sub-matrix; $P_V$ represents the second check sub-matrix; and P' meets P'(1:k_u:)=P_U(1:k_v:)+P_V, P'((1+k_v: k_u:)=P_U((1+k_v): k_u:), X(1: k_v:) represents a first row to a Kv^{th} row of a matrix X, and X is P' or $P_U$.

9. The apparatus according to claim 8, wherein a code length n of the U code is the same as that of the V code; and wherein the first information comprises a first code group and a second code group.

10. The apparatus according to claim 8, wherein the apparatus is a terminal device.

11. The apparatus according to claim 8, wherein the apparatus is an access device.

12. The apparatus according to claim 8, wherein the U code and the V code have a same code length.

13. The apparatus according to claim 8, wherein the U code and the V code are BCH codes with a same code length.

14. The apparatus according to claim 8, wherein the U code and the V code are RS codes with a same code length.

15. A coding apparatus, comprising:
at least one processor; and
a non-transitory computer readable storage medium storing a program that is executable by the at least one processor, the program including instructions to:
determine first information, wherein the first information comprises a to-be-coded element; and
code the first information by using generator matrices of systematic (U|U+V)-codes of H layers to obtain second information, wherein the generator matrices of the systematic (U|U+V)-codes of the H layers are constructed based on generator matrices of systematic codes of M mother codes, code lengths n of the M mother codes are the same, H is an integer greater than or equal to 1, and M=2^H; and transmit the second information;
wherein the U code and the V code are BCH codes or reed solomon (RS) codes;
wherein a generator matrix of an i^{th} systematic code at an h^{th} layer in a (U|U+V)-code of H layers consists of a generator matrix of a 2i^{th} systematic code at an (h−1)^{th} layer in the (U|U+V)-code of H layers and a generator matrix of a (2i−1)^{th} systematic code at the (h−1)^{th} layer; a generator matrix of an i^{th} systematic code at a first layer in the (U|U+V)-code of H layers consists of a generator matrix of a systematic code of a 2i^{th} mother code in the M mother codes and a generator matrix of a systematic code of a (2i−1)^{th} mother code; and h is an integer whose value ranges from 1 to H, and i is an integer whose value ranges from 1 to 2^{H-h}.

16. The apparatus according to claim 15, wherein:
the generator matrix of the i^{th} systematic code comprises an identity sub-matrix of the generator matrix of the systematic code of the 2i^{th} mother code and an identity sub-matrix of the generator matrix of the systematic code of the (2i−1)^{th} mother code, elements in a plurality of columns corresponding to the identity sub-matrix of the generator matrix of the systematic code of the 2i^{th} mother code are 0, and elements in a plurality of columns corresponding to the identity sub-matrix of the generator matrix of the systematic code of the (2i−1)^{th} mother code are 0;
a dimension of the 2i^{th} mother code is Ku, a dimension of the (2i−1)^{th} mother code is Kv, and a code length n of the 2i^{th} mother code is the same as that of the (2i−1)^{th} mother code; and
the first information comprises M code groups, M is a positive integer greater than 0, a code length of a (2i−1)^{th} code group in the M code groups is Ku, and a code length of a 2i^{th} code group in the M code groups is Kv.

17. The apparatus according to claim 16, wherein the M mother codes are BCH codes or RS codes.

18. The apparatus according to claim 16, wherein the M mother codes are BCH codes.

19. The apparatus according to claim 16, wherein the M mother codes are RS codes.

20. A communication system, comprising:
the coding apparatus according to claim 15; and
a decoding apparatus configured to receive the second information from the coding apparatus, and decode the second information.

* * * * *